United States Patent [19]

Priest

[11] Patent Number: 4,965,921

[45] Date of Patent: Oct. 30, 1990

[54] FLANGED AXLE SHAFT PULLING ASSIST DEVICE

[76] Inventor: Gordon W. Priest, 10 Quarry St., Acton, Mass. 01720

[21] Appl. No.: 402,458

[22] Filed: Sep. 5, 1989

[51] Int. Cl.[5] .............................................. B23P 19/04

[52] U.S. Cl. ........................................ 29/254; 29/244; 29/275; 29/426.5; 29/802

[58] Field of Search ...................... 29/426.5, 244, 254, 29/255, 802, 275, 276, 277, 803, 270, 259, 260, 264, 245

[56] References Cited

U.S. PATENT DOCUMENTS

| | | | |
|---|---|---|---|
| 1,284,409 | 11/1918 | Melia | 29/244 |
| 1,865,420 | 6/1932 | Kick | 29/426.5 |
| 2,310,615 | 2/1943 | Cloostian | 29/86.1 |
| 3,025,595 | 3/1962 | Stafford | 29/239 |
| 3,060,559 | 9/1962 | Levalon | 29/256 |
| 3,106,012 | 9/1963 | Compt | 29/254 |
| 4,283,827 | 8/1981 | Abel | 29/254 |
| 4,304,036 | 12/1981 | Bloomgren | 29/426.5 |

*Primary Examiner*—Joseph M. Gorski
*Assistant Examiner*—S. Thomas Hughes
*Attorney, Agent, or Firm*—Donald N. Halgren

[57] ABSTRACT

An axle shaft pulling assist device to help remove an axle having a flanged end, from a wheel hub, the device including an elongated main block with threaded biasing members which engage the back side of the flanged axle end. A striker shaft slidably arranged through the main block is hit, to jar the axle shaft loose, while the bias is being applied to the studs.

9 Claims, 5 Drawing Sheets

FLANGED AXLE SHAFT PULLING ASSIST DEVICE

BACKGROUND OF THE INVENTION (1) Field of the Invention

This invention relates to axle shaft removing tools, and more particularly to a portable tool for helping remove an axle shaft from the hub of a wheel assembly.

(2) Prior Art

Axle manufacturers design hub assemblies with dissimilar metal components. The hubs of these wheel assemblies may be made from one type of steel. Studs, which are utilized to secure the wheels to the hubs may be made from another type of steel, and have nuts to secure the axle shafts to the studs extending from the hubs. The axle shaft has a flange on its outer end which fastens the axle to the hub.

Slotted tapered collets are squeezed around the studs and are seated through tapered openings in the flange end of the axle. These collets become squeezed tightly onto the studs and prevent the flange (and axle) from being readily removed from the hub.

Hub manufacturers recommend removing the lug nuts, and then they recommend striking the center of the flange to jar the flange lose from the hub, so that the axle can then be removed from the hub. This may have an unfortunate side effect, of damaging the adjacent studs if your hammer blows are not perfectly accurate. The center of the flange is often damaged by repeated heavy sledge hammer blows.

One rather complicated hammer alternative is shown in U.S. Pat. No. 4,283,827 to Abel. It is a combersome device which utilizes only hammer blows to remove an axle.

U.S. Pat. No. 3,025,595 to Stafford shows an axle puller which presses a brake backing plate to force an axle lose. Its disadvantages are apparent when you consider that the brake backing plate was not meant for axle pulling.

Another hammer type device is shown in U.S. Pat. No. 3,106,012 to Comer, which shows a sliding hammer to jar the axle from the hub.

U.S. Patent to Christian shows a threadable housing which permits rotary motion of the axle to power itself from its housing. This could be problematical if motion from one raised hub were permitted momentarily to pass to the wheel remaining on the ground.

U.S. Pat. No. 4,304,036 to Blomgren adapts a link chain for removing a wheel hub of a tractor.

U.S. Pat. No. 3,060,559 discloses a bearing remover having adjustable bolts which pry up a bearing from an axle.

None of the prior art shows an easily adaptable, uncomplicated axle pulling device which permits a flanged full floating axle to be pulled from a hub with ease and no damage to the studs in the hub and axle.

BRIEF SUMMARY OF THE INVENTION

The present invention relates to axle pulling devices, and more particularly, to a device for pulling full floating axles having flanged ends, which flanged ends are bolted to the hub of a motor vehicle drive axle or axles.

The present invention provides a biasing means to be placed upon the flange at the distal end of an axle shaft, while permitting a simultaneous jarring of that distal end to loosen the flange of the axle shaft from the hub.

The biasing axle shaft pulling device comprises a main block which is adapted to extend diametrically across a flanged end of an axle shaft attached to a hub. The main block is elongated, having two ends which each have an end bore extending therethrough, parallel to one another. The main block has a crescent shaped centrally disposed recess arranged on a first face thereof. The recess is arranged so as to permit juxtaposition of the elongated main block adjacent the flanged end of an axle shaft, which end may be slightly hemispherically shaped.

A third bore is centrally disposed through the main block, parallel to the end bores in the main block. A flange is disposed onto each end of the main block, extending parallel to the end bores, and arranged on the first face side thereof. Each flange has a flange bore extending therethrough, which threadably receives a safety securement bolt. An adjustable puller bolt is loosely received in each end bore. Each puller bolt has a head on the end of the bolt extending out through the first face of the main block. Each puller bolt has an adjustable means such as a nut threadably received onto its other end.

A striker shaft is slidingly disposed through the central bore in the main block. The striker shaft has a first end which is arranged to engage the centralmost portion of the flanged end of the axle shaft. The striker shaft has a second end which has a ring disposed annularly thereadjacent.

In operation of the biasing axle shaft puller device, the nuts holding the wheel to the hub, are removed. The wheel may if desired be removed from the hub. The main block is then disposed over the flange and is disposed against four protruding axle studs extending through the flange. The head of the puller bolts are fitted around the backside, that is, the hub side of the flange on the axle shaft. The adjustment nuts are tightened so as to bring the main block against the ends of the studs extending longitudinally outwardly from the hub, (and through the flange on the end of the axle). The adjustment nuts are tightened so as to put a pressure or bias inwardly against the ends of the studs, away from the first face of the puller device. Each securement bolt is adjusted through the flange to press normally against their respective sides of the puller bolt, so that the puller bolts do not inadvertently come lose from their gripping of the backside of the flange on the end of the axle shaft.

The striker shaft is then placed through the central bore in the main block, until it abuts the distalmost portion of the cap comprising the central portion of the flanged end of the axle shaft. The striker shaft is struck with a hammer to jar the flange with respect to the hub, while the puller bolts are putting the bias, (the pushing) against the studs, while the puller bolts are also pulling on the flange too, permitting the release of the flange from the hub, allowing the axle shaft to be removed therefrom.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
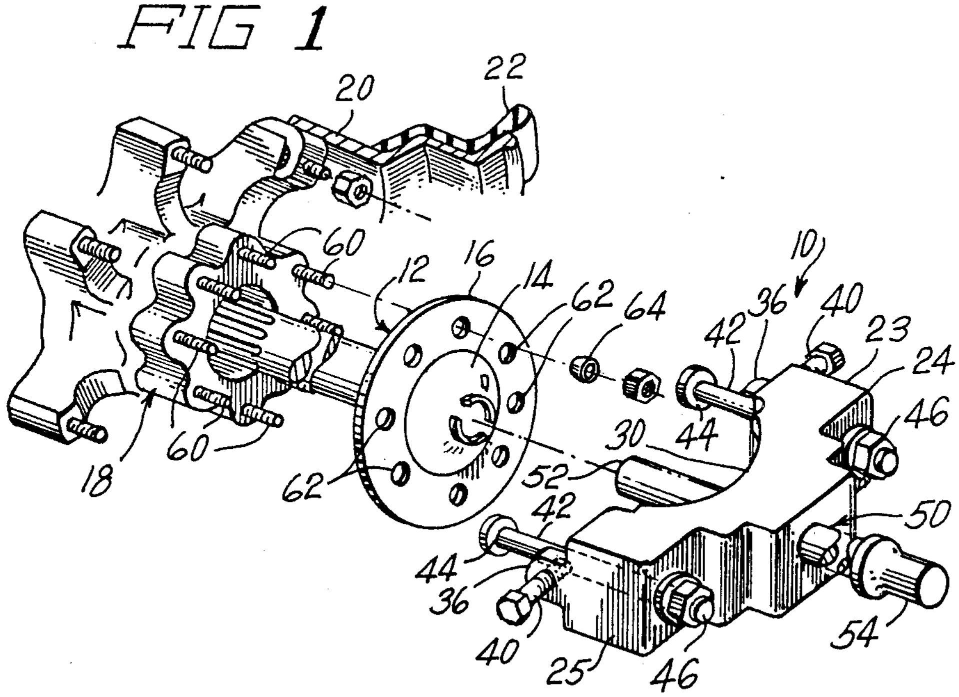
FIG. 1 is an exploded view of a biased axle shaft puller and a typical flanged axle and hub arrangement.

Referring now to the drawings in detail, and particularly to FIG. 1, there is shown, in exploded fashion, a biasing axle shaft pulling assist device 10, utilized to assist in the pulling of flanged axle shafts. The axle shaft pulling assist device 10 is shown arranged with respect to a flanged axle 12 having an end 14 with a flange 16. The flanged axle 12 extends through a hub 18 of a wheel 20, on which a tire 22 may be mounted. Typically, the wheel 20 is the type utilized on tractor-trailer and many other heavy duty trucks.

The axle pulling assist device 10 comprises an elongated main block 24 which is adapted to extend diametrically across the distal end 14 of an attached flanged axle shaft 12. The elongated main block 24 has two ends 23 and 25 which each have an end bore 26 and 28 perpendicularly therethrough, parallel to one another.

The main block 24 has a generally crescent shaped centrally disposed recess 30 arranged on a first face 32 thereof. The recess 30 is arranged to permit juxtaposition of the elongated main block 24 with respect to the end 14 of the flanged axle 12, which end 14 may be hemispherically shaped, as may be seen in FIGS. 2 and 3.

Figure 3:
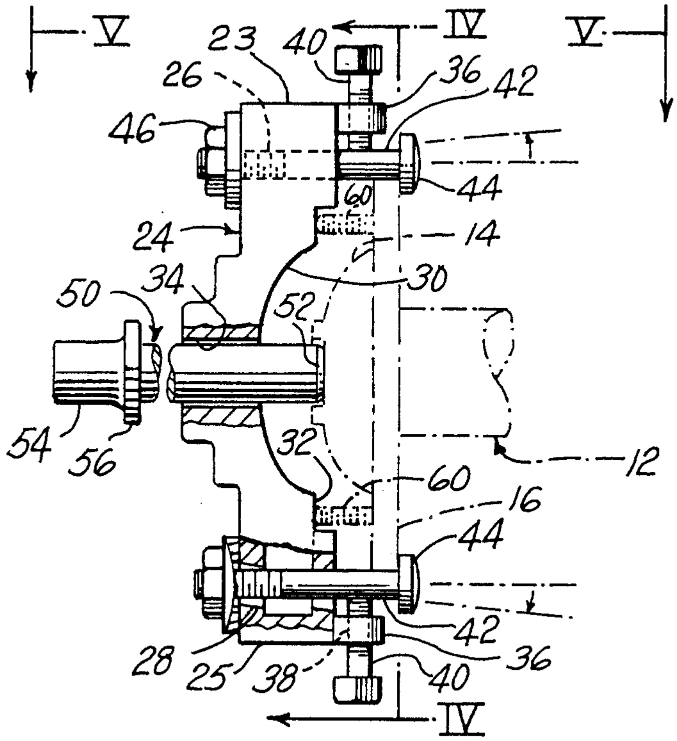
FIG. 3 is a plan view of the biasing axle shaft puller device.
Figure 4:
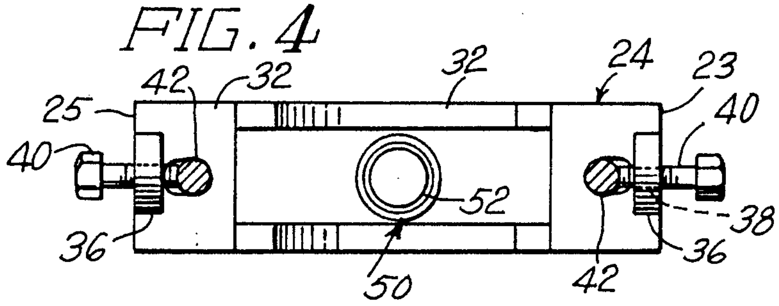
FIG. 4 is a view taken along the lines IV—IV of FIGURE 3.
Figure 5:
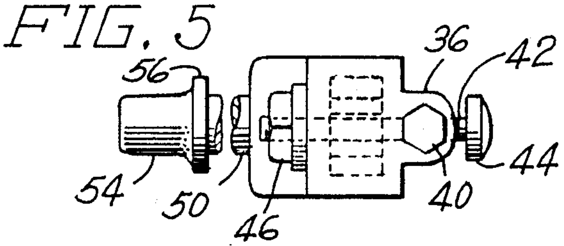
FIG. 5 is a view taken along the lines V—V of FIGURE 3.

A third bore 34 is centrally disposed through the main block 24, and is parallel to the end bores 26 and 28. A flange 36 is disposed onto each end of the main block 24, as shown in FIGS. 3, 4 and 5. The flanges 36 are parallel to the end bores 26 and 28, and extend from the first face 32 thereof. Each flange 36 has a bore 38 extending therethrough, which threadably receives a safety securement bolt 40. An adjustable puller bolt 42 is loosely received in each end bore 26 and 28, as shown in FIGS. 1 and 3. Each puller bolt 42 has an enlarged head 44, which extends from the first face side 32 of the main block 24. Each puller bolt 42 has an adjustment means such as a nut 46 threadably received onto its other end, as shown in FIG. 3.

A striker shaft 50 is slidably disposed through the central bore 34 in the main block 24. The striker shaft 50 has a first end 52 which is arranged so as to engage the central portion of the end 14 of the axle shaft 12. The striker shaft 50 has a second end 54 which may have a ring 56 disposed annularly thereabout to prevent the striker shaft 50 from being inverted either way.

Figure 2:
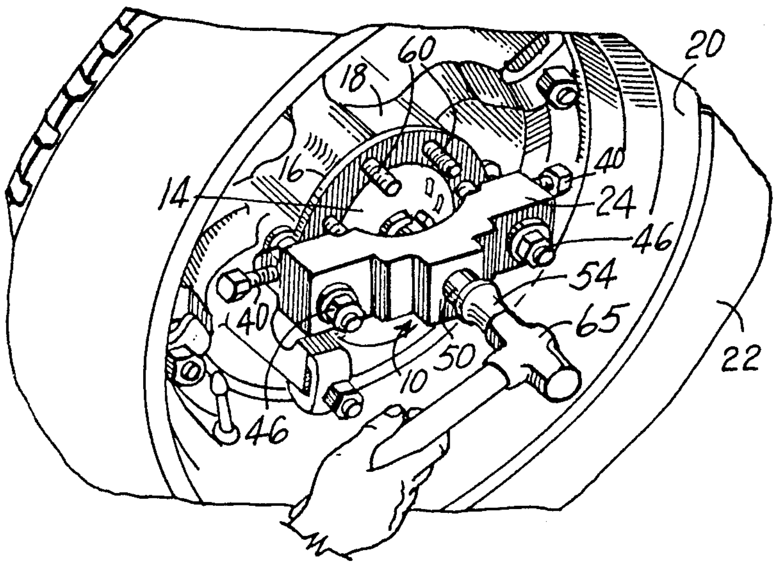
FIG. 2 is a perspective view of the device attached to an axle shaft.

In the typical wheel assembly 20 with a flanged axle shaft 12, an annular array of studs 60 extend distally from the hub 18, as shown in FIGS. 1 and 2. The flanged end 14 has an annular array of tapered holes 62 which correspond to the annular array of studs 60 extending from the hub 18. A collet 64, as shown in FIG. 1, is typically disposed around each stud 60 when axle 12 is secured to a hub 18. It is usually these collets 64 which get stuck or "frozen" to the flange 16 and or studs 60.

To get the axle shaft 12 free from the hub 18 and studs 60, the main block 24 is arranged diametrically across the hub 18 and end 14, as shown in FIGS. 1, 2 and phantom, in FIG. 3, with the crescent recess 30 facing the end 14.

The head 44 of each puller bolt 42 is adapted to extend around the back side of the flange 16, and the tightening nuts 46 are adjusted to pull the first face 32 against the distal ends of the studs 60, pressing against them with a biasing force when the puller bolts 42 are fully tightened up. Each safety securement bolt 40 is tightened or adjusted inwardly against the sides of the puller bolts 42 to prevent them from sliding away from the back side of the flange 16.

With the constant bias force of the front face 32 pushing longitudinally against the studs 60, and the safety securement bolts 40 keeping the puller bolts 42 properly in place while the puller bolts pull on the back of the flange, the striker shaft 50 may be hit with a hammer 65 or the like, to jar the axle shaft 12 from its stuck condition, thus permitting the axle shaft 12 to be removed from the hub 18.

I claim:

1. An axle shaft pulling assist device for the removal of an axle with a flanged end from studs on a hub of a truck wheel to which it is stuck, comprising:

an elongated main block having a first and a second end, adaptable to extend diametrically across the flanged end said of axle;

a puller means arranged in a pair of parallel bores arranged through each end of said main block, said puller means having a head to extend behind the edge of said flanged axle end;

an adjustable tightener means for forcing the main block against the studs of said hub, generating a biasing force thereagainst;

securement means directly engaged with each end of the main block, said securement means engageable with its respective puller means to prevent each of said puller means from slipping away from behind the flange of the axle end; and a striker means arranged through a central bore in said main block for jaring the end of the flanged axle, to permit the axle to become unstuck from the hub to which it is attached.

2. An axle shaft pulling assist device as recited in claim 1, wherein said puller means comprises a pair of threaded bolts, and said tightener means comprises a nut threadably received and said tightener means comprises a nut threadably received on each bolt, to tighten each bolt with respect to said main block.

3. An axle shaft pulling assist device as recited in claim 1, wherein said main block has a first face, said first face has a crescent shaped recess disposed thereon, to permit said main block to fit across said flanged end of said axle shaft.

4. An axle shaft pulling assist device as recited in claim 1, including a flange extending off of each end of the main block, each flange having a threaded bore therethrough, directed normal to the puller means.

5. An axle shaft pulling assist device as recited in claim 4 wherein said threaded bore in each flange receives said securement means therein, to permit adjustment of said securement means with respect to said puller means.

6. An axle shaft pulling assist device as recited in claim 5, wherein said securement means comprises a threaded bolt for holding said puller means in place.

7. An axle shaft pulling assist device as recited in claim 1, wherein said striker means comprises a shaft, said shaft being slidably received in said central bore.

8. An axle shaft pulling assist device as recited in claim 7, wherein said central bore and said parallel bores are all parallel to each other.

9. An axle shaft pulling assist device for the removal of an axle shaft having a flanged end from an array of studs on a hub of a truck wheel assembly to which said axle shaft is stuck, comprising:

an elongated main block extendable across the hub of said truck wheel assembly, said main block having a first and a second end;

a biasing means at each end of said main block, said biasing means comprising a puller means and an adjustable tightener means for creating a longitudinal force between said block and the studs on said hub thereadjacent;

a securement means directly engaged with each end of said main block and in engagement with each of said biasing means, to prevent slippage of said biasing means;

a gripping means for securing said flanged end with said block; and a striker means for hitting an end of said axle shaft loose from said hub to which it is stuck.

* * * * *